(12) United States Patent
Stiesdal

(10) Patent No.: US 8,157,939 B2
(45) Date of Patent: Apr. 17, 2012

(54) METHOD FOR MANUFACTURING OF A FIBRE REINFORCED LAMINATE AND OF A LATERALLY EXTENDED MATERIAL WHICH HAS IN A FIRST LATERAL DIRECTION A GREATER STIFFNESS THAN IN A SECOND LATERAL DIRECTION

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 401 days.

(21) Appl. No.: 12/431,202

(22) Filed: Apr. 28, 2009

(65) Prior Publication Data

US 2009/0269557 A1 Oct. 29, 2009

(30) Foreign Application Priority Data

Apr. 29, 2008 (EP) .................................. 08008188

(51) Int. Cl.
  *B29C 70/20* (2006.01)
  *B29C 70/36* (2006.01)
  *B32B 5/14* (2006.01)
(52) U.S. Cl. .................. 156/180; 428/103; 264/258
(58) Field of Classification Search .................. 156/180, 156/181; 428/103; 264/258
  See application file for complete search history.

(56) References Cited

U.S. PATENT DOCUMENTS

| | | | |
|---|---|---|---|
| 3,779,851 A * | 12/1973 | Hertz | ............................ 156/182 |
| 2003/0062647 A1 | 4/2003 | Deteresa et al. | |
| 2003/0180514 A1 | 9/2003 | Baudonnel | |
| 2004/0142143 A1 | 7/2004 | Corden et al. | |
| 2005/0048260 A1 | 3/2005 | Modin et al. | |
| 2008/0053596 A1 | 3/2008 | Davies et al. | |

FOREIGN PATENT DOCUMENTS

| | | |
|---|---|---|
| FR | 2 887 265 A1 | 12/2006 |
| WO | WO 95/20479 A1 | 8/1995 |
| WO | WO 01/23182 A1 | 4/2001 |
| WO | WO 2004/071761 A1 | 8/2004 |

* cited by examiner

*Primary Examiner* — Michael Tolin

(57) ABSTRACT

A method for manufacturing of a fiber reinforced laminate is provided that includes building up a part of the laminate to a determined thickness using at least one layer of fiber material placing a laterally extended layer on top of the partially completed laminate, the layer having in a first lateral direction a greater stiffness than in a second lateral direction and having in the first lateral direction a greater stiffness than the other layers constituting the laminate, building up a new part of the laminate to a determined thickness, and in case the thickness of the laminate built up pursuant is not as large as a desired thickness of the completed laminate, repeating steps placing a laterally extended layer and the building up a new part until the thickness of the laminate built up is equal to the desired thickness of the completed laminate.

7 Claims, 3 Drawing Sheets

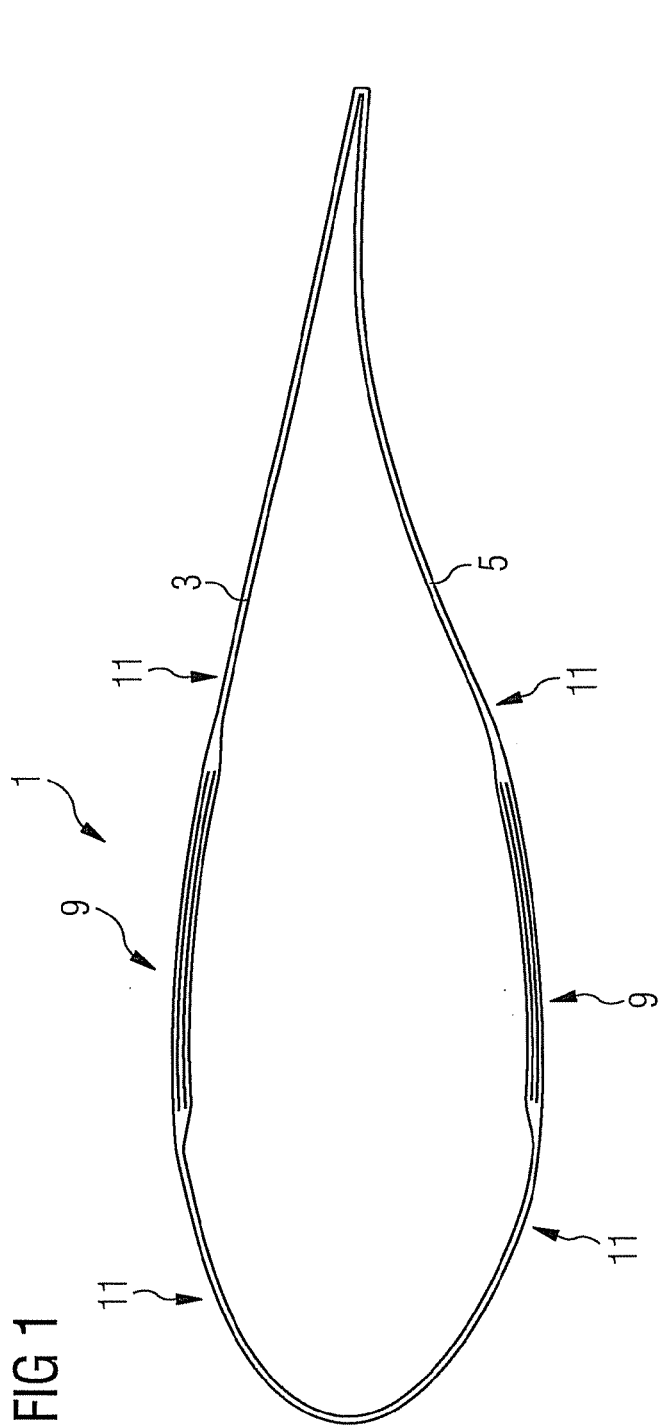
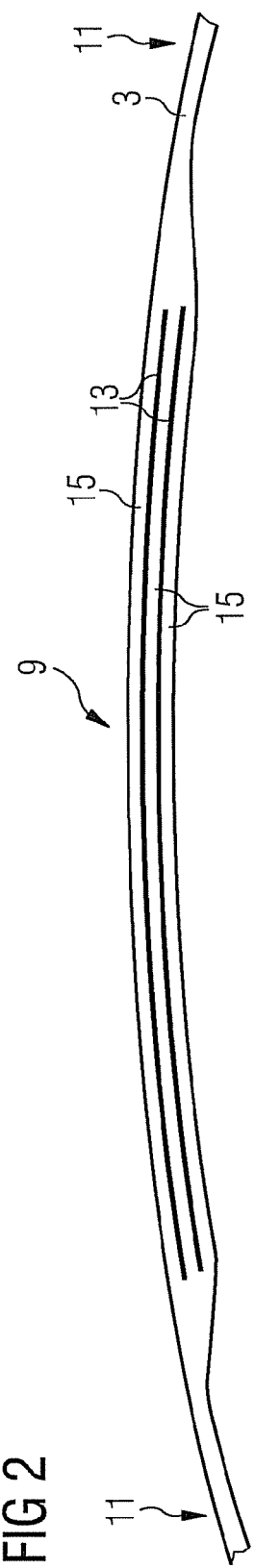

METHOD FOR MANUFACTURING OF A FIBRE REINFORCED LAMINATE AND OF A LATERALLY EXTENDED MATERIAL WHICH HAS IN A FIRST LATERAL DIRECTION A GREATER STIFFNESS THAN IN A SECOND LATERAL DIRECTION

CROSS REFERENCE TO RELATED APPLICATIONS

This application claims priority of European Patent Office application No. 08008188.8 EP filed Apr. 29, 2008, which is incorporated by reference herein in its entirety.

FIELD OF INVENTION

The present invention relates to a method for manufacturing a fibre reinforced laminate, to a method for manufacturing a laterally extended material which has in a first lateral direction a greater stiffness than in a second lateral direction, to a use of a laterally extended material which has in a first lateral direction a greater stiffness than in a second lateral direction, and to a laterally extended fibre material.

BACKGROUND OF INVENTION

The structural characteristics of a fibre reinforced laminate are usually governed by the amount, type and orientation of the reinforcement fibres. Typically, the stiffness and strength of fibres can only be taken into account to the extent that loading occurs in the longitudinal fibre direction. Therefore, a traditionally designed laminate assumes that the fibres of the finished laminate will be oriented in the same direction as the direction of the fibres when placed in the mould. However, in some cases wrinkles in the fibre layers may occur as a result of the manufacturing process. In such cases the wrinkled fibres no longer have the desired orientation, and severe overload of the laminate may be the result.

Wrinkles may occur for a number of reasons. The thermal expansion of a laminate during curing may exceed the thermal expansion of the mould, in which case the laminate may come under compressive pressure before the matrix material, typically a thermoplastic or thermosetting material, is cured sufficiently to maintain the fibres in the desired orientation. Uneven structures underneath the laminate or undulations in the surface on which the laminate is built up may also include wrinkles.

Wrinkles in fibre reinforced laminates are typically prevented by a combination of arrangements. The laminate thickness is kept below certain limits in order to minimise exothermal heat generation. Moulds and other surfaces on which the laminate is built up are maintained at a high quality. Curing is carried out at carefully controlled temperature gradients so as to minimise differences in the thermal expansion.

Another method for avoiding wrinkles in the fibre layers consists of including layers of wrinkle-preventing material between the fibre layers. Wrinkle-preventing material is manufactured in such a way that it is stiffer than normal fibre material. When positioned between layers of, for example, fibreglass mats, the fibres in the mats are largely prevented from wrinkling, because the mats are kept flat by the wrinkle-preventing material.

The wrinkle-preventing material can be a pre-cured solid, perforated or mesh-like laminate or a solid, perforated or mesh-like material other than a laminate, for example wood or metal.

In US2005/0048260 A1 a method for fabricating a laminated composite body including a metal foil and a plurality of fibre plies is disclosed. The method includes perforating a sheet of metal foil, stacking the perforated metal foil sheet in the plurality of fibre plies in face to face relation in a predetermined order and orientation, and infusing resin into the stacked sheet and plies so that resin flows through the perforations in the metal foil sheet and intersperses between the plurality of fibre plies to form the laminated composite body. Instead of a perforated metal foil also a plurality of metal foil strips may be used to make laminated fibre metal composite structures.

In WO 2004/071761 A1 a laminate of at least two plates formed from aluminium alloy is disclosed, between which an intermediate layer on the basis of plastic which contains at least two groups of continuous, mutually parallel fibres is situated. The intermediate layer is connected to the metal plates.

In WO 95/20479 a method of manufacturing a composite laminate having a plurality of unidirectional orientated layers, for example layers of matrix material reinforced with unidirectional orientated fibres is disclosed. At least one inner metal layer, for example a metal layer that does not form an outer surface of the laminate, together with the other layers is arranged so as to give a balanced and symmetric laminate.

SUMMARY OF INVENTION

If wrinkles do occur in fibre reinforced laminates despite preventive action repair or rejection of the laminate will usually be required, as the loss of stiffness and/or strength in wrinkles will often exceed any realistic safety margins.

It is therefore a first objective of the present invention to provide an advantageous method for manufacturing of a fibre reinforced laminate. It is a second objective of the present invention to provide an advantageous use of a laterally extended material which has in a first lateral direction a greater stiffness than in a second lateral direction. A third objective is to provide a method for manufacturing a laterally extended material which has in a first lateral direction a greater stiffness than in a second lateral direction. It is a fourth objective of the present invention to provide a laterally extended fibre material which has in a first lateral direction a greater stiffness than in a second lateral direction.

The first objective is solved by a method for manufacturing a fibre reinforced laminate. The second objective is solved by a use of a laterally extended material. The third objective is solved by a method for manufacturing a laterally extended material, and the fourth objective is solved by a laterally extended fibre material. The depending claims define further developments of the invention.

The inventive method for manufacturing of a fibre reinforced laminate comprises the steps of: a) building up a part of the laminate to a determined thickness using at least one layer of fibre material, b) placing a laterally extended layer on top of the partially completed laminate, the layer having in a first lateral direction a greater stiffness than in a second lateral direction and having in the first lateral direction a greater stiffness than the other layers constituting the laminate, c) building up a new part of the laminate to a determined thickness, and d) in case the thickness of the laminate built up pursuant to the steps a)-c) is not as large as a desired thickness of the completed laminate, repeating steps b) and c) until the thickness of the laminate built up is equal to the desired thickness of the completed laminate.

The greater stiffness of a laterally extended layer in a second lateral direction compared to a first lateral direction effectively prevents an occurrence of wrinkles in the other layers of fibre material. Because the laterally extended layer retains its flexibility in the first direction it is easier to drape compared to a completely stiff layer.

The laterally extended layer which has in a first lateral direction a greater stiffness than in a second lateral direction and which has in a first lateral direction a greater stiffness than the other layers constituting the laminate can be placed as the lowermost layer of the laminate. Moreover, the laterally extended layer which has in a first lateral direction a greater stiffness than in a second lateral direction and which has in the first lateral direction a greater stiffness than the other layers constituting the laminate may be placed as the uppermost layer of the laminate.

Advantageously, a partly pre-cured layer of the same material as the material of the other layers constituting the laminate may be used as the layer of a material which has in a first lateral direction a greater stiffness than in a second lateral direction and which has in the first lateral direction a greater stiffness than the other layers constituting the laminate.

Preferably, a layer which has in a first lateral direction a greater stiffness than in a second lateral direction and which has in the first lateral direction a greater stiffness than the other layers constituting the laminate may be used which comprises a fibre material which is partly impregnated with resin and pre-cured such that the resin forms spaced stripes continuing along the first lateral direction. This means that the layer is only partly impregnated by resin. Therefore, the un-impregnated parts of the layer will become integrated in the laminate in the same way as the rest of the fibre material.

Furthermore, a partly pre-cured layer of a laminate material which is different to the material of the other layers constituting the laminate and chosen such as to provide a desired stiffness ratio relative to the stiffness of the finished fibre reinforced laminate can be used as the layer of a material which has in a first lateral direction a greater stiffness than in a second lateral direction and which has in the first lateral direction a greater stiffness than the other layers constituting the laminate.

Moreover, at least two different layers which have in a first lateral direction a greater stiffness than in a second lateral direction and which have in the first lateral direction a greater stiffness than the other layers constituting the laminate may be placed in such a way that the first lateral directions of the at least two different layers include an angle between 0° and 180°. Preferably, the first lateral directions of the greater stiffness of two subsequent layers run orthogonally to each other.

Furthermore, the fibre reinforced laminate may be part of a wind turbine blade.

Generally, a laterally extended material is in the context of the present invention a material with a lateral dimension which is considerably larger than the thickness of the material. Moreover, the laterally extended layer and/or the laterally extended material may comprise different portions with a greater stiffness in a first lateral direction than in a second lateral direction, wherein the first lateral directions of the different portions may be orientated differently relative to each other.

In the inventive use a laterally extended material which has in a first lateral direction a greater stiffness than in a second lateral direction and which has in the first lateral direction a greater stiffness than other layers constituting a laminate is used in a method for manufacturing of a fibre reinforced laminate.

In the inventive use of a laterally extended material the material which has in the first lateral direction a greater stiffness than the other layers constituting the laminate is the same material as the material of the other layers of the fibre reinforced laminate, but partly pre-cured. This means that the material, for example a fibre material, may be only partly impregnated, for example by resin, and pre-cured. Preferably most of the material can be left dry. By this means a maximal flexibility of the material in the second lateral direction can be maintained.

The inventive method for manufacturing a laterally extended material which has in a first lateral direction a greater stiffness than in a second lateral direction comprises the steps of partly impregnating at least one layer of fibre material with resin in such way that the resin forms spaced stripes continuing along the first lateral direction, and curing the resin. For example, at least two layers of fibre material can be placed on top of each other before partly impregnating them with resin. The obtained material will be stiff in the direction of the stripes but will retain the flexibility of the original fibre material in the orthogonal direction. Moreover, the at least two layers of fibre material may have different length and/or width. This can, for example, result in a varying thickness of the laterally extended material.

In the context of the present of the present invention the laterally extended layers with a greater stiffness in a first lateral direction than in a second lateral direction are also denoted as laterally extended, wrinkle-preventing layers.

The laterally extended material manufactured as described above can be placed in a mould between layers of dry fibre material. Several layers of the laterally extended material can be placed in the mould separated by layers of dry fibre material to further manufacture a fibre reinforced laminate. The un-impregnated parts of the laterally extended material can be impregnated by resin at the same time as the rest of the fibre material in the mould when a resin infusion process is started. Therefore the laterally extended, wrinkle-preventing material becomes an integrated part of the finished laminate. If a laterally extended, wrinkle-preventing material is produced by completely impregnating the fibre material, there is a risk that a weak layer of un-reinforced resin forms between the laterally extended, wrinkle-preventing material and the rest of the laminate, which could lead to de-lamination. This risk is eliminated by the inventive method for manufacturing of a fibre reinforced laminate. Preferably the laterally extended, wrinkle-preventing material can be placed in such a way that the stripes of resin run substantially in the direction where the strength of the laminate is most critical. If strength is required in more than one direction, more layers of the laterally extended, wrinkle-preventing material can be used and placed in such a way that the stripes in two subsequent layers run orthogonally to each other.

The laterally extended, wrinkle-preventing material can be made of several layers of fibre material. Each layer can have a different length or width such that a laterally extended, wrinkle-preventing material of varying thickness results. This can be important if the laterally extended, wrinkle-preventing material is used in a laminate, the cross section of which is not constant. If, for example, the thickness of a laminate tapers off towards one end, the number of layers of fibre material as well as the number of layers of laterally extended, wrinkle-preventing material will gradually be reduced over some length of the laminate. If a layer of laterally extended, wrinkle-preventing material is thick, the layers of fibre material adjacent to the laterally extended, wrinkle-preventing material will tend to fold around the end of the laterally extended, wrinkle-preventing material. This can have the same effect on the strength of the laminate as the wrinkles of the laterally extended, wrinkle-preventing material is supposed to prevent. Advantageously, the used laterally extended material can also have a tapered shape.

The inventive laterally extended fibre material which has in a first lateral direction a greater stiffness than in a second lateral direction comprises at least one layer of fibre material which is partly impregnated with resin and cured in such way that the resin forms spaced stripes continuing along the first lateral direction.

Compared to the pre-cured solid, perforated or mesh-like laminate described in the state of the art, the inventive laterally extended fibre material has the following advantages. It retains its flexibility in one direction and is therefore easier to drape. Moreover it is only partly impregnated by resin. Therefore the un-impregnated parts of the material will become integrated in the laminate in the same way as the rest of the fibre material in a method for manufacturing of a fibre reinforced laminate. Furthermore the inventive laterally extended fibre material can be produced with a varying thickness. This makes it suitable for use in, for example, laminates with a tapered shape.

The laterally extended, wrinkle-preventing material according to the invention is suitable for the manufacture of wind turbine blades because of its stiffness in one direction combined with its flexibility in the orthogonal direction. A wind turbine must have a high strength in the direction of its longitudinal axis. In the direction orthogonal to the longitudinal axis a wind turbine blade is strongly curved. Therefore a fibre material which is flexible in this direction is easier to drape. Also the thickness of a wind turbine blade tapers off towards the tip of the blade. Therefore it is advantageous to use a laterally extended, wrinkle-preventing material with varying thickness.

The inventive method for manufacturing of a fibre reinforced laminate can especially be used for manufacturing a wind turbine rotor blade.

BRIEF DESCRIPTION OF THE DRAWINGS

Further features, properties and advantages of the present invention will become clear from the following description of an embodiment of the invention in conjunction with the accompanying drawings. The described features are advantageous alone and in combination with each other.

FIG. 1 schematically shows a section through a laminated wind turbine rotor blade.

FIG. 2 schematically shows a detail of FIG. 1.

DETAILED DESCRIPTION OF INVENTION

Figure 3:
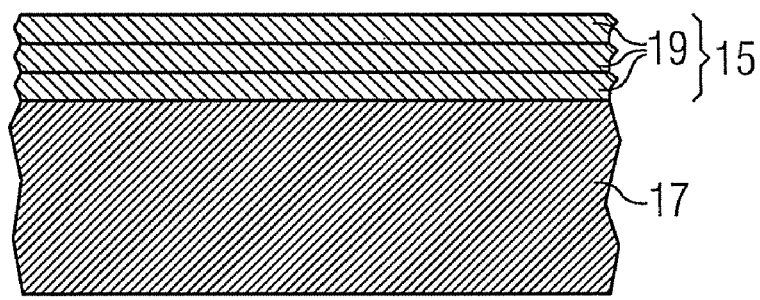
FIG. 3 schematically shows a first stage in the process of producing a rotor blade according to FIG. 1.

An embodiment of the present invention will now be described with reference to FIGS. 1 to 6. FIG. 1 is a schematic view of the cross-section of a laminated wind turbine rotor blade 1. The rotor blade 1 is made of an upper shell 3 and a lower shell 5 each comprising a thickened section 9 and non thickened sections 11. The upper and lower shells 3, 5 comprise a number of fibre reinforced layers which are not individually shown in the figure. In the thickened section 9 the number of fibre reinforced layers is increased with respect to the non-thickened sections 11.

The thickened section 9 of the upper shell 3 is shown in more detail in FIG. 2. In the thickened section 9, laterally extended layers 13 having in a first lateral direction a greater stiffness than in a second lateral direction and having in the first lateral direction a greater stiffness than the other fibre reinforced layers constituting the laminate are present between stacks of fibre reinforced layers 15. The laterally extended layers 13 with a greater stiffness in a first lateral direction than in a second lateral direction will also be denoted as laterally extended, wrinkle-preventing layers.

The stacks of fibre reinforced layers 15, as well as the laterally extended, wrinkle-preventing layers 13, are embedded in a resin matrix which has been formed by resin infusion and subsequent curing of the resin. During the infusion and curing process the laterally extended, wrinkle-preventing layers 13 prevent the fibre reinforced layers from the formation of wrinkles as the higher stiffness does not allow the fibre reinforced layers sandwiched between the mould and a laterally extended, wrinkle preventing layer 13 or between two laterally extended, wrinkle preventing layers 13 to fold substantially in the direction perpendicular to the extension of the fibres in the fibre reinforced layers.

The method of forming the wind turbine rotor blade 1 shown in FIGS. 1 and 2 will now be described with respect to FIGS. 3 to 5.

In general, the upper and lower shells 3, 5 of the rotor blade 1 are produced by placing dry fibre reinforced layers 19 on top of each other in a mould 17, wetting the fibre reinforced layers 19 by means of a resin infusion and subsequently curing the resin. Please note that although described with respect to producing a wind turbine rotor blade 1, the method which will be described with respect to FIGS. 3 to 5 can also be used for producing other fibre reinforced laminated structures, e.g. in boat building.

A first stage of the method for manufacturing the rotor blade 1 shown in FIG. 1 is shown in FIG. 3. The figure schematically shows a cut-out sectional view of the mould 17 and a number of fibre reinforced layers 19, e.g. glass fibre layers, carbon fibre layers or aramid fibre layers, which are placed dry in the mould 17 on top of each other so as to form a stack 15 of the fibre reinforced layers 19.

Figure 4:
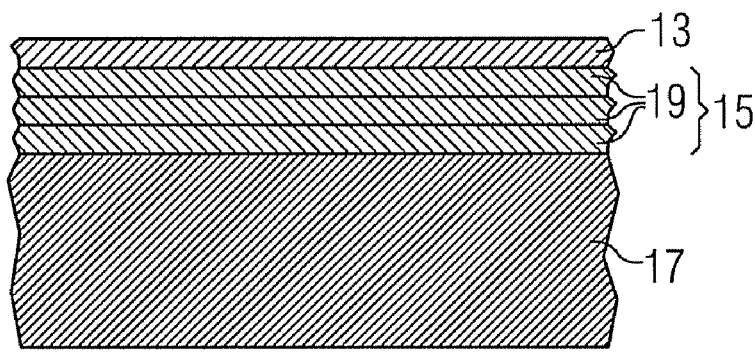
FIG. 4 shows a second stage in the process of producing a rotor blade according to FIG. 1.

After a stack 15 of fibre reinforced layers has been placed in the mould 17 a laterally extended, wrinkle-preventing layer 13 is placed on top of the stack 15 (see FIG. 4).

Figure 5:
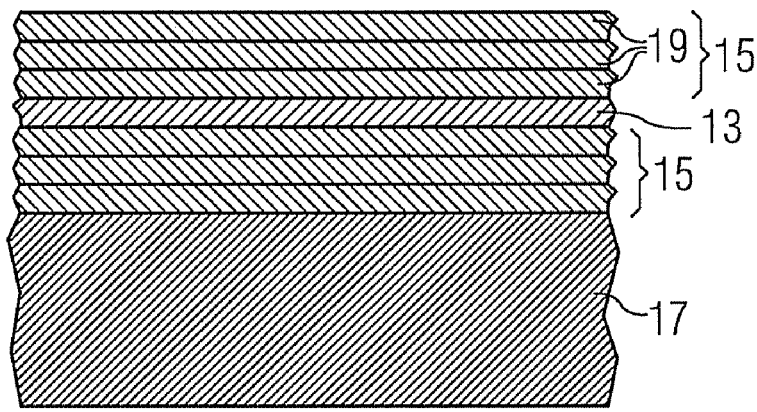
FIG. 5 shows a third stage in the process of producing a rotor blade according to FIG. 1.

After the laterally extended, wrinkle-preventing layer 13 has been placed on top of the first stack 15 of fibre reinforced layers 19, another stack 15 comprising a number of fibre reinforced layers 19 is placed on top of the laterally extended, wrinkle-preventing layer 13, as shown in FIG. 5.

Alternately layering stacks 15 of fibre reinforced layers 19 and laterally extended, wrinkle-preventing layers 13 can be continued until the desired thickness of the layering is reached. The number of fibre reinforced layers 19 in a stack 15 can be as high as possible without negatively influencing the wrinkle-preventing effect of the laterally extended, wrinkle-preventing layers 13.

Although not shown in FIG. 3 to 5, one or more additional laterally extended, wrinkle-preventing layers 13 may be present under the lowermost stack 15 of fibre reinforced layers 19. In this case, a laterally extended, wrinkle-preventing layer 13 would be the first layer placed in the mould 17. The outermost layer of the overall stack consisting of stacks 15 of fibre reinforced layers 19 alternating with laterally extended, wrinkle-preventing layers 13 may also be at least one laterally extended, wrinkle-preventing layer 13.

After the layering of the dry fibre reinforced layers 19 and the dry laterally extended, wrinkle-preventing layers 13, the mould 17 is closed and a vacuum is applied to the mould 17. Then, a thermoplastic or thermosetting material such as the already mentioned resin, e.g. a polyester resin or an epoxy resin, is infused into the evacuated mould 17. The resin wets the fibre reinforced layers 19 and the laterally extended, wrinkle-preventing layers 13. After a while all fibre reinforced layers 19, and also all laterally extended, wrinkle-preventing layers 13, are sufficiently wetted. Then, the resin is cured. After curing the resin, the mould 17 is dismantled.

During the curing process the laterally extended, wrinkle-preventing layers 13 prevent the fibre reinforced layers 19 from forming wrinkles, i.e. from folding up in a direction substantially perpendicular to the extension of the fibres in the fibre reinforced layers 19 since they have higher stiffness than the fibre reinforced layers 19 so that they do not fold themselves. As a consequence, there is no or only minimal space available for the formation of wrinkles between the mould 17 and a laterally extended, wrinkle-preventing layer 13 or between two laterally extended, wrinkle-preventing layers 13. Moreover, even if wrinkles would occur in a stack 15 of fibre reinforced layers sandwiched between the mould 17 and a laterally extended, wrinkle-preventing layer 13 or between two laterally extended, wrinkle-preventing layers 13 such wrinkles would be confined to this particular stack 15 by the laterally extended, wrinkle-preventing layer(s) 13 since the wrinkles cannot propagate through the stiff wrinkle-preventing layer(s) 13.

Figure 6:
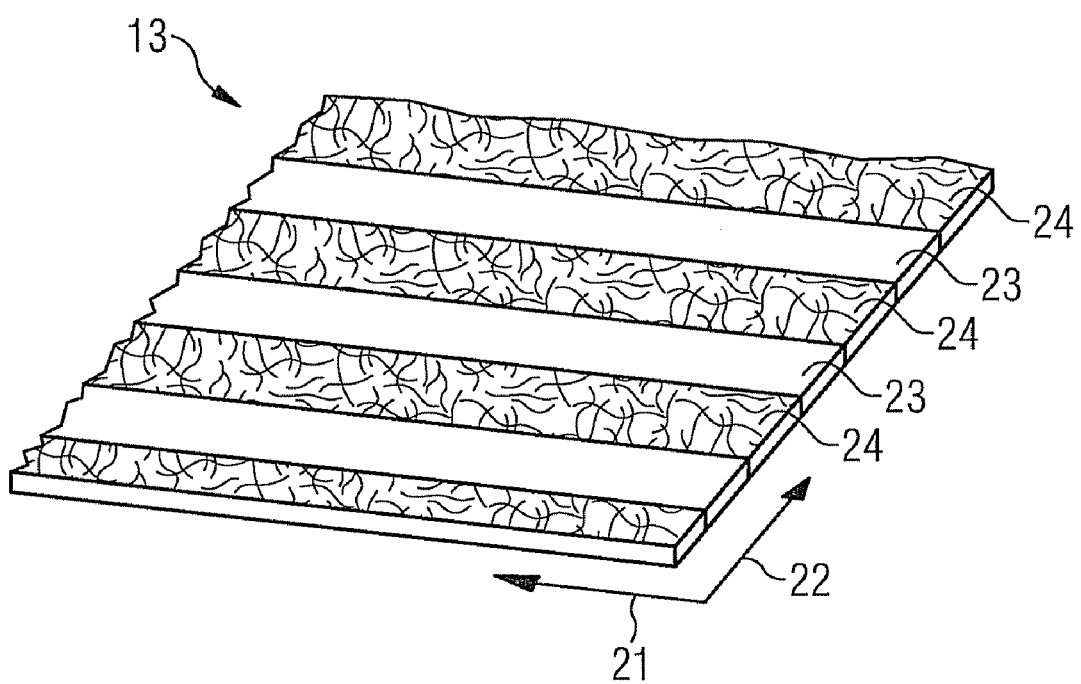
FIG. 6 schematically shows part of a laterally extended fibre layer with a greater stiffness in a first lateral direction than in a second lateral direction in a perspective view.

FIG. 6 schematically shows part of a laterally extended, wrinkle-preventing layer 13 in a perspective view. The laterally extended, wrinkle-preventing layer 13 is a fibre layer with a greater stiffness in a first lateral direction 21 than in a second lateral direction 22.

The laterally extended, wrinkle-preventing layer 13 comprises portions of dry fibre material 23 and portions of pre-cured resin impregnated fibre material 24. The alternating portions of dry fibre material 23 and pre-cured resin impregnated fibre material 24 are formed as stripes which run along a first lateral direction 21. The spaced stripes of pre-cured resin impregnated fibre material 24 have a greater stiffness than the portions of dry fibre material 23. This causes a greater stiffness of the whole laterally extended, wrinkle-preventing layer 13 in the direction of the stripes of pre-cured resin impregnated fibre material 24, which is the first lateral direction 21, than in the perpendicular direction, which is the second lateral direction 22. Therefore, the laterally extended, wrinkle-preventing layer 13 is flexible in the second lateral direction 22 and stiff in the first lateral direction 21. This means that the material is easy to drape.

The laterally extended, wrinkle-preventing layer 13 consists of one or more layers of fibre material placed on top of each other and impregnated by resin in such a way that the resin forms stripes in the first direction 21. Thus the fibre material is only partly impregnated; most of it is left dry. When the resin has cured, the laterally extended, wrinkle-preventing layer 13 is stiff in the first direction 21, which is the direction of the stripes 23, 24, but retains the flexibility of the original fibre material in the second direction 22, which runs orthogonal to the first direction 21.

The invention claimed is:

1. A method for manufacturing a fibre reinforced laminate, comprising:
   providing one or more wrinkle preventing layers, each wrinkle preventing layer being produced by partly impregnating a layer of fibre material with resin in such a way that the resin forms spaced stripes continuing along a first lateral direction and curing the resin to provide a desired level of stiffness in the first lateral direction which is greater than a stiffness in a second lateral direction of the wrinkle preventing layer;
   building up a first part of the laminate to a first thickness using at least one layer of fibre material;
   placing a wrinkle preventing layer against the first part of the laminate;
   further building up the laminate using at least one additional layer of fibre material after the step of placing a wrinkle preventing layer; and
   repeating the placing and further building steps until the thickness of the laminate is equal to a desired thickness of a completed laminate.

2. The method as claimed in claim 1, wherein a lowermost layer of the wrinkle preventing layers includes the resin along the first lateral direction.

3. The method as claimed in claim 2, wherein an uppermost layer of the wrinkle preventing layers includes the resin along the first lateral direction.

4. The method as claimed in claim 1, wherein an angle between the first lateral direction and the second lateral direction is between 0° and 180°.

5. The method as claimed in claim 1, wherein the first lateral direction and the second lateral direction are orthogonal to each other.

6. The method as claimed in claim 1, wherein the completed laminate is in the form of a wind turbine blade.

7. The method as claimed in claim 1, wherein the wrinkle preventing layers have a different length and/or a different width.

* * * * *